(12) United States Patent
Takamatsu et al.

(10) Patent No.: US 10,337,626 B2
(45) Date of Patent: Jul. 2, 2019

(54) HEATING MEDIUM CHANNEL SWITCHING DEVICE, AND AIR CONDITIONING DEVICE INCLUDING THE HEATING MEDIUM CHANNEL SWITCHING DEVICE

(71) Applicant: Mitsubishi Electric Corporation, Chiyoda-ku, Tokyo (JP)

(72) Inventors: Ryohei Takamatsu, Tokyo (JP); Mizuki Ogawa, Tokyo (JP); Koji Saito, Tokyo (JP); Masaru Imaizumi, Tokyo (JP); Yuji Motomura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 140 days.

(21) Appl. No.: 15/314,351

(22) PCT Filed: Jun. 9, 2015

(86) PCT No.: PCT/JP2015/066601
§ 371 (c)(1),
(2) Date: Nov. 28, 2016

(87) PCT Pub. No.: WO2016/009749
PCT Pub. Date: Jan. 21, 2016

(65) Prior Publication Data
US 2017/0191574 A1 Jul. 6, 2017

(30) Foreign Application Priority Data
Jul. 18, 2014 (JP) .................................. 2014-147435

(51) Int. Cl.
*F16K 11/076* (2006.01)
(52) U.S. Cl.
CPC .................. *F16K 11/076* (2013.01)

(58) Field of Classification Search
CPC .. F16K 11/076; F16K 11/085; F16K 11/0853; F16K 11/0856; Y10T 137/86541;
(Continued)

(56) References Cited

U.S. PATENT DOCUMENTS 2,533,931 A   12/1950 Hartley
2,678,062 A   5/1954 MacNeill
(Continued)

FOREIGN PATENT DOCUMENTS

CN   1289031 A   3/2001
CN   102112815 A   6/2011
(Continued)

OTHER PUBLICATIONS

Office Action dated Mar. 20, 2018, by the Chinese Patent Office in corresponding Chinese Patent Application No. 201580022523.9 and English translation of the Office Action. (14 pages).
(Continued)

*Primary Examiner* — Eric Keasel
(74) *Attorney, Agent, or Firm* — Buchanan Ingersoll & Rooney PC

(57) ABSTRACT

In a heating medium channel switching device, a valve body whose interior is partitioned into two channels by a partition plate is axially rotated by a motor, whereby a relative position of the valve body in a valve chamber is controlled. Because of this, one of a first heating medium and second heating medium can be selected and caused to flow out in one channel, and one of a third heating medium and fourth heating medium can be selected and caused to flow in the other channel. Also, heating medium flow can be controlled by an angle of rotation of the valve body being controlled.

11 Claims, 11 Drawing Sheets

(58) Field of Classification Search
CPC ..... Y10T 137/86558; Y10T 137/86662; Y10T 137/86871
USPC ............ 137/625.16, 625.19, 625.24, 625.47
See application file for complete search history.

(56) References Cited

U.S. PATENT DOCUMENTS

| | | | |
|---|---|---|---|
| 3,021,869 | A | 2/1962 | Ross |
| 3,098,506 | A | 7/1963 | Spragens |
| 3,190,584 | A | 6/1965 | Gire et al. |
| 3,199,539 | A * | 8/1965 | Leathem ............... B30B 15/24 137/625.24 |
| 3,918,493 | A | 11/1975 | Tobias |
| 4,055,151 | A | 10/1977 | Cummings et al. |
| 4,345,622 | A | 8/1982 | Henningsson |
| 4,355,659 | A | 10/1982 | Kelchner |
| 4,445,540 | A | 5/1984 | Baron et al. |
| 4,506,703 | A | 3/1985 | Baron |
| 4,543,996 | A | 10/1985 | Baron |
| 4,658,859 | A | 4/1987 | Backe et al. |
| 4,716,923 | A | 1/1988 | West |
| 4,986,307 | A | 1/1991 | Hardee |
| 5,172,725 | A | 12/1992 | Kitagawa |
| 5,820,133 | A | 10/1998 | Altshuler |
| 5,868,165 | A | 2/1999 | Tranovich |
| 6,308,739 | B1 | 10/2001 | Barbuto et al. |
| 6,470,913 | B1 | 10/2002 | Woodworth |
| 6,647,934 | B2 | 11/2003 | Marsh et al. |
| 6,681,805 | B2 | 1/2004 | McLane et al. |
| 6,994,316 | B2 | 2/2006 | Pervaiz |
| 7,516,942 | B2 | 4/2009 | Grau et al. |
| 7,690,397 | B2 | 4/2010 | Hollis |
| 7,814,964 | B2 | 10/2010 | Greer |
| 8,733,120 | B2 * | 5/2014 | Morimoto ............... F24F 1/26 62/324.6 |
| 8,813,783 | B2 | 8/2014 | Morris |
| 8,905,076 | B2 | 12/2014 | Jorgensen et al. |
| 9,435,447 | B2 | 9/2016 | Wattellier et al. |
| 9,696,070 | B2 | 7/2017 | Ohta |
| 2003/0196713 | A1 | 10/2003 | Ma |
| 2004/0040315 | A1 | 3/2004 | Koyama et al. |
| 2004/0173510 | A1 | 9/2004 | Jung |
| 2004/0182455 | A1 | 9/2004 | Wells et al. |
| 2007/0068667 | A1 | 3/2007 | Greer |
| 2008/0302994 | A1 | 12/2008 | Syzkulski |
| 2011/0126931 | A1 | 6/2011 | Ide et al. |
| 2011/0192184 | A1 | 8/2011 | Yamashita et al. |
| 2012/0006050 | A1 | 1/2012 | Takayama et al. |
| 2012/0006436 | A1 | 1/2012 | Morimoto et al. |
| 2012/0031130 | A1 | 2/2012 | Morimoto et al. |
| 2012/0048411 | A1 | 3/2012 | Steyer et al. |
| 2012/0180515 | A1 | 7/2012 | Morimoto et al. |
| 2013/0134341 | A1 | 5/2013 | Cheng |
| 2013/0174594 | A1 | 7/2013 | Yamashita et al. |
| 2014/0182329 | A1 | 7/2014 | Yamashita et al. |
| 2014/0290659 | A1 | 10/2014 | Chen et al. |
| 2014/0373562 | A1 | 12/2014 | Suzuki et al. |
| 2014/0374081 | A1 | 12/2014 | Kakehashi et al. |
| 2015/0000327 | A1 | 1/2015 | Kakehashi et al. |
| 2016/0003490 | A1 | 1/2016 | Motomura et al. |
| 2017/0191706 | A1 | 7/2017 | Ogawa et al. |
| 2017/0254425 | A1 | 9/2017 | Takamatsu et al. |

FOREIGN PATENT DOCUMENTS

| | | |
|---|---|---|
| CN | 102575880 A | 7/2012 |
| DE | 195 07 919 A1 | 9/1996 |
| DE | 102005031962 A1 | 1/2007 |
| EP | 1 087 188 A1 | 3/2001 |
| EP | 3 171 097 A1 | 5/2017 |
| FR | 2 656 668 A1 | 7/1991 |
| FR | 2 988 460 A1 | 9/2013 |
| GB | 821898 A | 10/1959 |
| GB | 2526486 A | 11/2015 |
| JP | S51-083932 U | 7/1976 |
| JP | S52-106642 U | 8/1977 |
| JP | S59-170572 A | 9/1984 |
| JP | S 60-97598 U | 7/1985 |
| JP | 3049769 U | 6/1998 |
| JP | 2001-091078 A | 4/2001 |
| JP | 2007-309333 A | 11/2007 |
| JP | 2011-043188 A | 3/2011 |
| JP | 2013-230805 A | 11/2013 |
| WO | 2006/109639 A1 | 10/2006 |
| WO | WO 2010/049998 A1 | 5/2010 |
| WO | 2010/119555 A1 | 10/2010 |
| WO | 2010/137137 A1 | 12/2010 |
| WO | 2011/048724 A1 | 4/2011 |
| WO | 2012/070192 A1 | 5/2012 |
| WO | WO 2014/128961 A1 | 8/2014 |
| WO | WO 2014/128962 A1 | 8/2014 |

OTHER PUBLICATIONS

International Search Report (PCT/ISA/210) dated Sep. 8, 2015, by the Japanese Patent Office as the International Searching Authority for International Application No. PCT/JP2015/066601.
Written Opinion (PCT/ISA/237) dated Sep. 8, 2015, by the Japanese Patent Office as the International Searching Authority for International Application No. PCT/JP2015/066601.
Extended European Search Report dated Mar. 1, 2018, issued by the European Patent Office in corresponding European Application No. 15821359.5. (7 pages).
Office Action (The First Office Action) dated May 2, 2018, by the State Intellectual Property Office (SIPO) of the People's Republic of China in Chinese Patent Application No. 201580038942.1 and an English Translation of the Office Action. (14 pages).
The extended European Search Reporting dated Jan. 19, 2018, by the European Patent Office in European Patent Application No. 15822338.6-1008. (9 pages).
The extended European Search Reporting dated May 2, 2018, by the European Patent Office in European Patent Application No. 15833371.6-1015. (8 pages).
International Search Report (Form PCT/ISA/210) dated Aug. 18, 2015, by the Japanese Patent Office as the International Searching Authority for International Application No. PCT/JP2015/066600. (5 pages).
International Search Report (Form PCT/ISA/210) dated Aug. 25, 2015, by the Japanese Patent Office as the International Searching Authority for International Application No. PCT/JP2015/064986. (5 pages).
Office Action (Notification of Reasons for Refusal) dated Jan. 30, 2018, by the Japanese Patent Office in Japanese Patent Application No. 2016-534323, and an English Translation of the Office Action. (6 pages).
Office Action (Notification of Reason for Refusal) dated Apr. 18, 2017, by the Japanese Patent Office in Japanese Patent Application No. 2016-543844, and an English Translation of the Office Action. (7 pages).
Office Action (Notification of Reasons for Refusal) dated Aug. 1, 2017, by the Japanese Patent Office in Japanese Patent Application No. 2016-534323, and an English Translation of the Office Action. (11 pages).
Wrritten Opinion (Form PCT/ISA/237) dated Aug. 18, 2015, by the Japanese Patent Office as the International Searching Authority for International Application No. PCT/JP2015/066600. (6 pages).
Written Opinion (Form PCT/ISA/237) dated Aug. 25, 2015, by the Japanese Patent Office as the International Searching Authority for International Application No. PCT/JP2015/064986. (5 pages).
Office Action dated Jul. 20, 2018, by the Chinese Patent Office in Chinese Patent Application No. 201580033319.7 and English translation of the Office Action. (15 pages).
Office Action dated Dec. 27, 2018, by the Chinese Patent Office in corresponding Chinese Patent Applicatio No. 201580022523.9 and English translation of the Office Action. (11 pages).

* cited by examiner

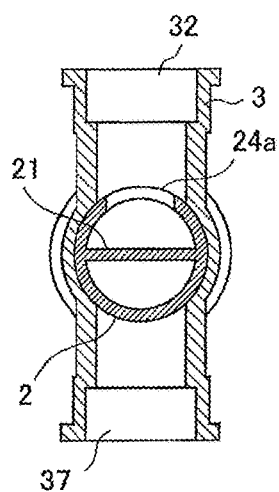 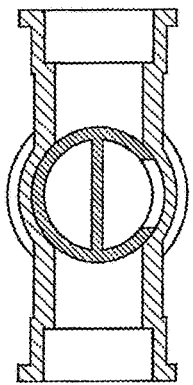 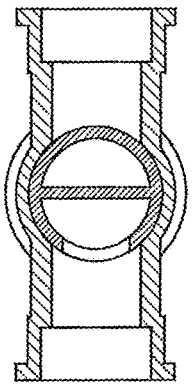 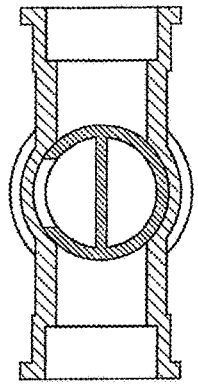
FIG. 6A    FIG. 6B    FIG. 6C    FIG. 6D
FIG. 7
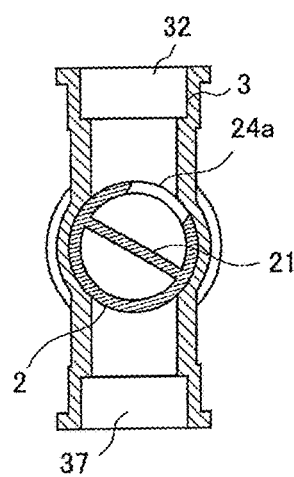

HEATING MEDIUM CHANNEL SWITCHING DEVICE, AND AIR CONDITIONING DEVICE INCLUDING THE HEATING MEDIUM CHANNEL SWITCHING DEVICE

TECHNICAL FIELD

The present invention relates to a heating medium channel switching device included in an air conditioning device such as, for example, an office-building use multi-split type air conditioner.

BACKGROUND ART

An air conditioning device such as an office-building use multi-split type air conditioner is such that one outdoor unit (heat source machine), disposed on an office-building rooftop or the like, and indoor units, disposed one each in a multiple of spaces subjected to air conditioning inside a building, are connected, and the temperature of each space subjected to air conditioning is regulated.

As an existing air conditioning device, there is a device such that cooling or heating of a space subjected to air conditioning is carried out by a refrigerant such as a hydrofluorocarbon (HFC) being caused to circulate between an outdoor unit and an indoor unit. The device is such that, when cooling, a refrigerant cooled in the outdoor unit absorbs heat from the air in a space subjected to air conditioning in the indoor unit, and when heating, a refrigerant heated in the outdoor unit releases heat into the air in a space subjected to air conditioning from the indoor unit.

However, a device wherein a refrigerant such as an HFC circulates as far as an indoor unit has a problem in that the refrigerant leaks inside a space subjected to air conditioning. In order to resolve this kind of problem, an air conditioning device wherein a relay unit is provided between an outdoor unit and an indoor unit, a refrigerant is caused to circulate from the outdoor unit as far as the relay unit, and a heating medium such as water is caused to circulate from the relay unit to the indoor unit, has been proposed in, for example, Patent Document 1.

An inter-heating medium heat exchanger, which causes an exchange of heat between the refrigerant and heating medium to be carried out, and a heating medium channel switching device are included in the relay unit of the existing air conditioning device. A heating-use heating medium heated in the inter-heating medium heat exchanger is conveyed to an indoor unit that carries out a heating operation, and a cooling-use heating medium cooled in the inter-heating medium heat exchanger is conveyed to an indoor unit that carries out a cooling operation. The heating-use heating medium or cooling-use heating medium carries out an exchange of heat with the air in a space subjected to air conditioning in the indoor unit, thereby realizing a heating operation or cooling operation.

Also, a composite valve including a first valve chamber that houses a body of a mixing/switching valve, a second valve chamber that houses a body of a flow control valve, and a channel that causes the first valve chamber and second valve chamber to communicate, has been proposed in Patent Document 2 as a composite valve such that manufacturing costs can be restricted, and for which no plumbing is necessary even when a multiple of the valve are disposed.

CITATION LIST

Patent Literature

Patent Document 1: International Publication WO2010-049998
Patent Document 2: JP-A-2011-43188

SUMMARY OF INVENTION

Technical Problem

The kind of existing air conditioning device presented in Patent Document 1 is such that, as a heating operation and cooling operation are realized in each indoor unit, a heating medium channel switching device for switching between a heating-use heating medium and cooling-use heating medium is needed in all channels that convey heating media from the relay unit to the indoor units. Also, a heating medium channel switching device for switching between a heating-use heating medium and cooling-use heating medium is also needed in all channels that return heating media from the indoor units to the relay unit, because of which two heating medium channel switching devices are needed for one indoor unit.

Furthermore, as the temperature of a space subjected to air conditioning is regulated by controlling the flow of a heating medium conveyed from the relay unit to each indoor unit, one heating medium flow regulating device is needed for one indoor unit. Consequently, the existing air conditioning device is such that two heating medium channel switching devices and one heating medium flow regulating device are needed for each indoor unit, and furthermore, a control part including three motors that drive one each of the two heating medium channel switching devices and one heating medium flow regulating device, a connecting pipe, a coupling part, and the like, are needed. Because of this, there is a problem in that the device is large and manufacturing costs are high.

The composite valve presented in Patent Document 2 is such that a motor for driving the mixing/switching valve body and a motor for driving the flow control valve body are needed, and there is a problem in that manufacturing costs are high. Also, body and valve body thicknesses are uneven, and in particular, the thickness of a portion of the valve body linking the first valve chamber and second valve chamber is large, because of which it is supposed that contraction of this portion is considerable, and the portion is liable to become deformed when molding. In such a case, a secondary processing step such as a mechanical processing is needed after molding, and manufacturing costs increase.

The invention, taking the heretofore described problems into consideration, has an object of providing a heating medium channel switching device such that a reduction in size and a reduction in manufacturing costs of an air conditioning device can be achieved.

Also, the invention has an object of achieving a reduction in size and a reduction in manufacturing costs of an air conditioning device by including the heating medium channel switching device according to the invention.

Solution to Problem

A heating medium channel switching device according to the invention includes a cylindrical valve body wherein an interior is partitioned into two channels by a partition plate disposed in a longitudinal direction and two aperture portions that form a heating medium outlet and inlet are provided in a side surface corresponding to each of the channels, and a body having a valve chamber that houses the valve body, a plurality of inlets that communicate with the aperture portions and allow a heating medium to flow into the valve body, and a plurality of outlets that communicate with the aperture portions and allow a heating medium to flow out from the valve body.

Also, an air conditioning device according to the invention is an air conditioning device including a heat source machine disposed outdoors, a plurality of indoor units installed in a space subjected to air conditioning, and a relay unit disposed between the heat source machine and indoor units, and having a refrigerant circulation circuit that causes a heat source side refrigerant to circulate and a heating medium circulation circuit that causes a heating medium to circulate, wherein the relay unit includes an inter-heating medium heat exchanger, which carries out an exchange of heat between a heat source side refrigerant and a heating medium, and the heating medium channel switching device according to the invention.

Advantageous Effects of Invention

According to the heating medium channel switching device according to the invention, by including a valve body whose interior is partitioned into two channels by a partition plate, two kinds of heating medium can be switched in each of the two channels, whereby a reduction in device size and a reduction in manufacturing costs are achieved.

Also, according to an air conditioning device including the heating medium channel switching device according to the invention, two kinds of heating medium can be switched in each of a channel that conveys a heating medium to an indoor unit and a channel that returns a heating medium after an exchange of heat in the indoor unit to an inter-heating medium heat exchanger, whereby a reduction in device size and a reduction in manufacturing costs are achieved.

Objects, characteristics, aspects, and advantages of the invention other than those heretofore described will be further clarified by the following detailed description of the invention, with reference to the drawings.

BRIEF DESCRIPTION OF DRAWINGS

FIG. 6A to FIG. 6D are partial sectional views showing the channels when the valve body is caused to rotate in increments of 90 degrees by the motor in the heating medium channel switching device according to the first embodiment of the invention.

FIG. 7 is a partial sectional view showing the channels when the valve body is caused to rotate by 30 degrees by the motor in the heating medium channel switching device according to the first embodiment of the invention.

DESCRIPTION OF EMBODIMENTS

First Embodiment

Figure 1:
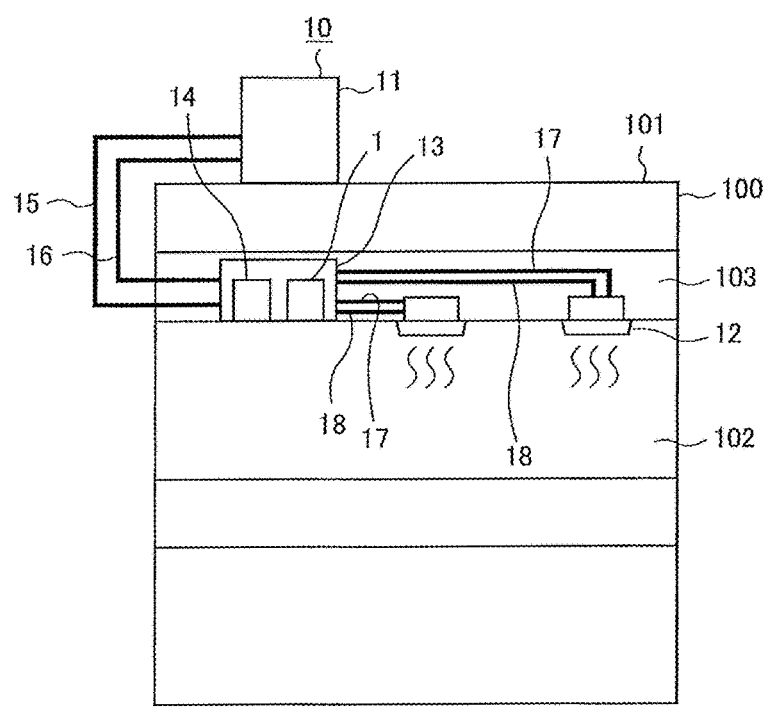
FIG. 1 is a schematic view showing an installation example of an air conditioning device according to a first embodiment of the invention.

Hereafter, based on the drawings, a description will be given of a heating medium channel switching device according to a first embodiment of the invention, and of an air conditioning device including the heating medium channel switching device. FIG. 1 is a schematic view showing an installation example of an air conditioning device according to the first embodiment. An air conditioning device 10 has a refrigerant circulation circuit, which causes a heat source side refrigerant to circulate, and a heating medium circulation circuit that causes a heating medium such as water to circulate, and an operating mode (cooling or heating) can be selected in each indoor unit 12.

The air conditioning device 10 includes an outdoor unit 11, which is a heat source machine disposed outdoors, a multiple of indoor units 12, and a relay unit 13. The outdoor unit 11 is installed on a rooftop 101 of a building 100 such as, for example, an office building. The indoor unit 12 is installed in an indoor space 102, which is a space subjected to air conditioning. The relay unit 13 is installed in a space 103 that is not subjected to air conditioning, such as above a ceiling, as a unit separate from the outdoor unit 11 and indoor unit 12.

The relay unit 13 has a multiple of heating medium channel switching devices 1 and an inter-heating medium heat exchanger 14. A refrigerant conveying connection pipe 15, which conveys a heat source side refrigerant, and a refrigerant returning connection pipe 16 are provided between the outdoor unit 11 and relay unit 13. Also, a heating medium conveying pipe 17, which conveys a heating medium, and a heating medium returning pipe 18 are provided between the relay unit 13 and indoor unit 12.

Although not shown in FIG. 1, a warm water conveying pipe, a cold water conveying pipe, a warm water returning pipe, and a cold water returning pipe are connected to each of the inter-heating medium heat exchanger 14 and heating medium channel switching device 1. Installation examples of these pipes will be described hereafter using FIG. 8 and FIG. 9.

An operation of the air conditioning device 10 will be described. A heat source side refrigerant is conveyed from the outdoor unit 11 to the relay unit 13 via the refrigerant conveying connection pipe 15. The conveyed heat source side refrigerant is caused to carry out an exchange of heat (warmed or cooled) with a heating medium by the inter-heating medium heat exchanger 14 inside the relay unit 13, whereby warm water or cold water is made. The heat source side refrigerant after the heat exchange is conveyed to the outdoor unit 11 through the refrigerant returning connection pipe 16.

Meanwhile, warm water or cold water is selected by the heating medium channel switching device 1 provided for each indoor unit 12, and the warm water or cold water made in the inter-heating medium heat exchanger 14 is conveyed to the indoor unit 12 through the heating medium conveying pipe 17. The warm water or cold water conveyed to the indoor unit 12 carries out an exchange of heat with air of the indoor space 102 inside the indoor unit 12. The heating medium after the heat exchange is carried out is conveyed to the heating medium channel switching device 1 through the heating medium returning pipe 18, where warm water or cold water is selected, and returned to the inter-heating medium heat exchanger 14.

For example, a single refrigerant such as R-22, R-134a, or R32, a quasi-azeotropic mixed refrigerant such as R-410A or R-404A, a non-azeotropic mixed refrigerant such as R-407C, a refrigerant whose chemical symbol includes a double bond and whose global warming coefficient is of a comparatively low value, such as $CF_3CF=CH_2$ or a compound thereof, or a natural refrigerant such as $CO_2$ or propane, is used as the heating source side refrigerant. Also, water, antifreeze, a mixture of water and antifreeze, a mixture of water and an additive with a high anti-corrosive effect, or the like, is used as the heating medium.

Places in which the outdoor unit 11 and relay unit 13 configuring the air conditioning device 10 are installed are not limited by FIG. 1. For example, the outdoor unit 11 may be installed in, for example, a machine room or in the interior of the building 100, provided that this is an environment wherein waste heat can be exhausted using an exhaust duct or the like. Also, the relay unit 13 may be installed in a common space in which there is an elevator or the like, or in the vicinity of the outdoor unit 11. However, when the distance from the relay unit 13 to the indoor unit 12 is too great, power needed to convey the heating medium increases, which point should be borne in mind as impeding energy saving.

Also, the indoor unit 12, not being limited to the ceiling cassette type shown in FIG. 1, may be a ceiling embedded type, a ceiling suspended type, or the like. It is sufficient that the indoor unit 12 can blow warming air or cooling air into the indoor space 102 directly, or indirectly using a duct or the like.

Furthermore, the number of the outdoor unit 11, indoor unit 12, and relay unit 13 connected not being particularly limited, it is sufficient that the number is determined in accordance with the number of spaces subjected to air conditioning. However, when a multiple of relay units 13 are connected to one outdoor unit 11, it is desirable that the relay units 13 are installed scattered around a space such as a common space of the building 100 or above a ceiling. By so doing, the air conditioning load can be handled by the inter-heating medium heat exchanger 14 in each relay unit 13. Also, the distance between the indoor unit 12 and relay unit 13 can be shortened, whereby energy saving is achieved.

Figure 2:
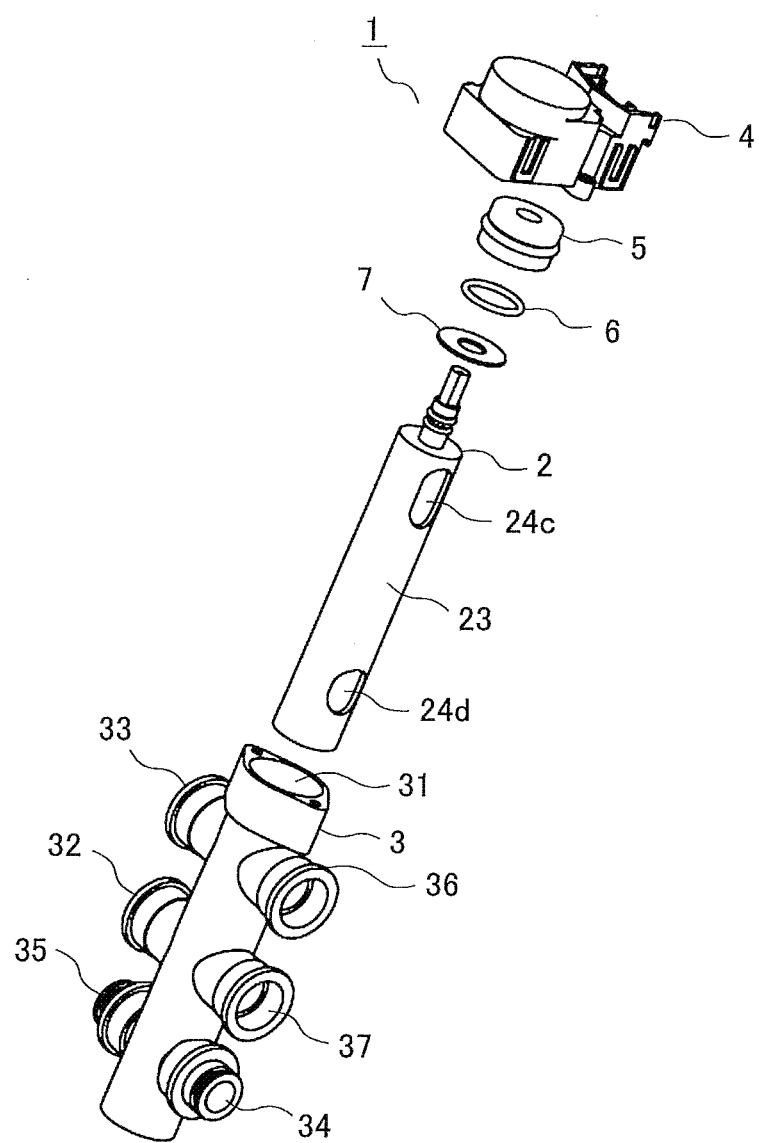
FIG. 2 is an exploded perspective view showing a heating medium channel switching device according to the first embodiment of the invention.
Figure 3:
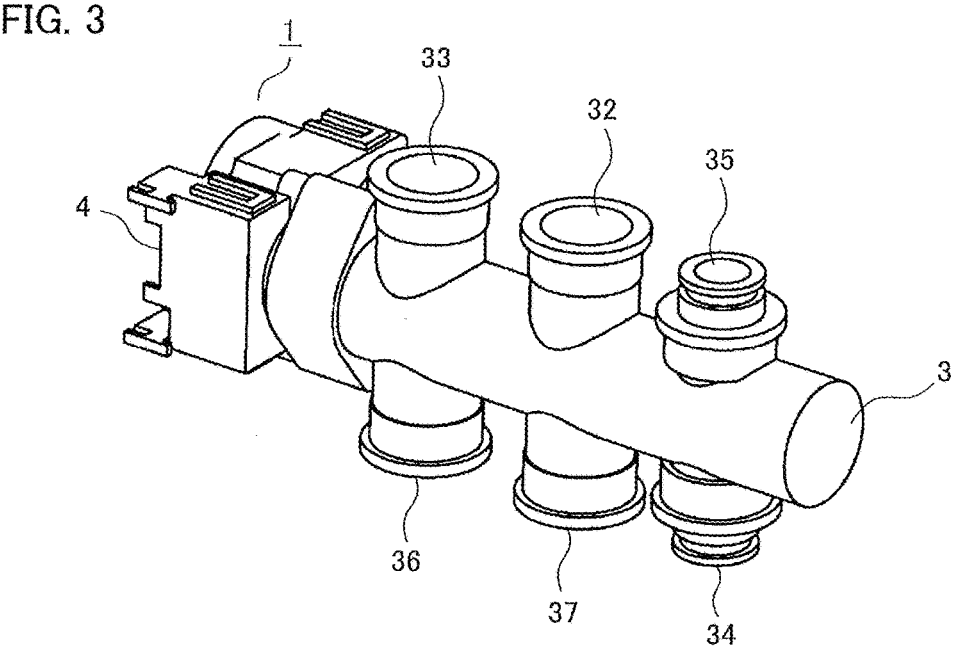
FIG. 3 is a perspective view showing the heating medium channel switching device according to the first embodiment of the invention.
Figure 4:
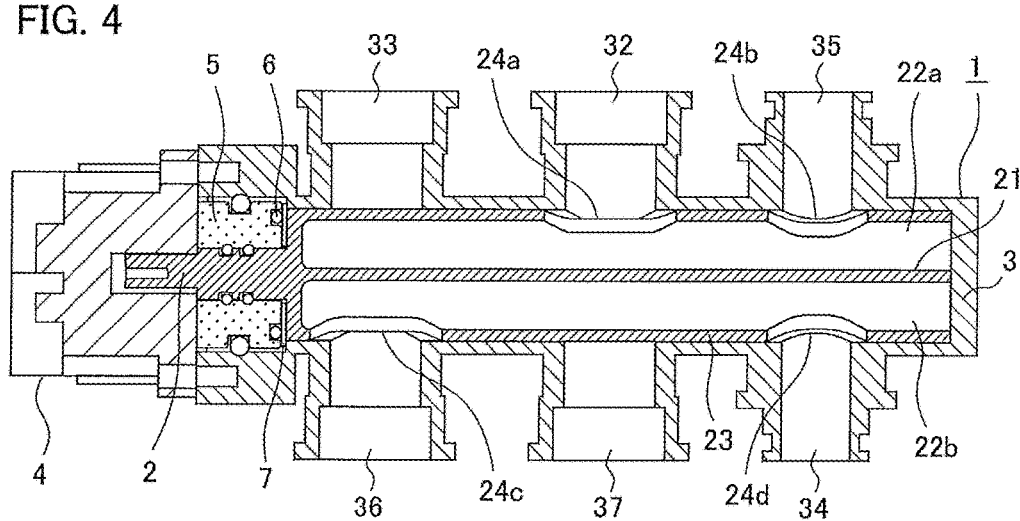
FIG. 4 is a sectional view showing the heating medium channel switching device according to the first embodiment of the invention.

Next, the heating medium channel switching device 1 according to the first embodiment will be described in detail. FIG. 2 to FIG. 4 are an exploded perspective view, an overall perspective view, and a sectional view showing the heating medium channel switching device 1 according to the first embodiment. The same reference signs are allotted to the same or corresponding portions in each drawing. The heating medium channel switching device 1 includes a cylindrical valve body 2, a body 3 having a valve chamber 31 that houses the valve body 2, and a motor 4 that causes the valve body 2 to axially rotate inside the valve chamber 31, thereby controlling the relative position of the valve body 2 inside the valve chamber 31.

As shown in FIG. 4, the valve body 2 is such that an interior thereof is partitioned into two channels 22a and 22b (collectively called channels 22) by a partition plate 21 disposed in a longitudinal direction, and two aperture portions (collectively called aperture portions 24) that form a heating medium outlet and inlet are provided in a side surface 23 corresponding to each channel 22. In the example shown in FIG. 4, aperture portions 24a and 24b are provided in the side surface 23 corresponding to the channel 22a, and aperture portions 24c and 24d are provided in the side surface 23 corresponding to the channel 22b.

The body 3 has the valve chamber 31 that houses the valve body 2, a multiple of inlets that communicate with the aperture portions 24 of the valve body 2 and allow the heating medium to flow into the valve body 2, and a multiple of outlets that communicate with the aperture portions 24 of the valve body 2 and allow the heating medium to flow out from the valve body 2.

Specifically, the body 3 has a first inlet 32 into which warm water (a first heating medium) made in the inter-heating medium heat exchanger 14 flows, a second inlet 33 into which cold water (a second heating medium) made in the inter-heating medium heat exchanger 14 flows, and a common outlet 35 out of which either one of the first heating medium or second heating medium flows, and these are disposed in one row in an axial direction.

Furthermore, the body 3 has a common inlet 34 into which either one of warm water (a third heating medium) after an exchange of heat in the indoor unit 12 or cold water (a fourth heating medium) after an exchange of heat in the indoor unit 12 flows, a third outlet 36 out of which the third heating medium flows, and a fourth outlet 37 out of which the fourth heating medium flows, and these are disposed in one row in an axial direction.

The motor 4 causes the valve body 2 to axially rotate inside the valve chamber 31, thereby controlling the relative position of the valve body 2 inside the valve chamber 31. Specifically, the valve body 2 is controlled so that one aperture portion 24 of one channel 22 communicates with either one of the first inlet 32 or second inlet 33 while the other aperture portion 24 of the channel 22 communicates with the common outlet 35, and one aperture portion 24 of the other channel 22 communicates with the common inlet 34 while the other aperture portion 24 of the channel 22 communicates with either one of the third outlet 36 or fourth outlet 37.

Also, in addition to a holder 5, an O-ring 6, and packing 7, the heating medium channel switching device 1 includes an unshown part coupling screw, metal plate, and the like in a portion connecting the valve body 2 and motor 4. In FIG. 2, the O-ring 6 is disposed between the holder 5 and packing 7, but the O-ring 6 is also disposed between the valve body 2 and holder 5, or between the holder 5 and body 3. The O-ring 6 prevents leakage of a heating medium from between regions, and at the same time absorbs a dimensional tolerance of each part.

As the packing 7 has an advantage of reducing torque when the valve body 2 rotates, it is desirable that the packing 7 is installed. When the packing 7 is not inserted, the necessary torque of the motor 4 increases due to frictional resistance of the O-ring 6 between the holder 5 and valve body 2, and it may happen that the O-ring 6 breaks and leakage occurs.

Figure 5A:
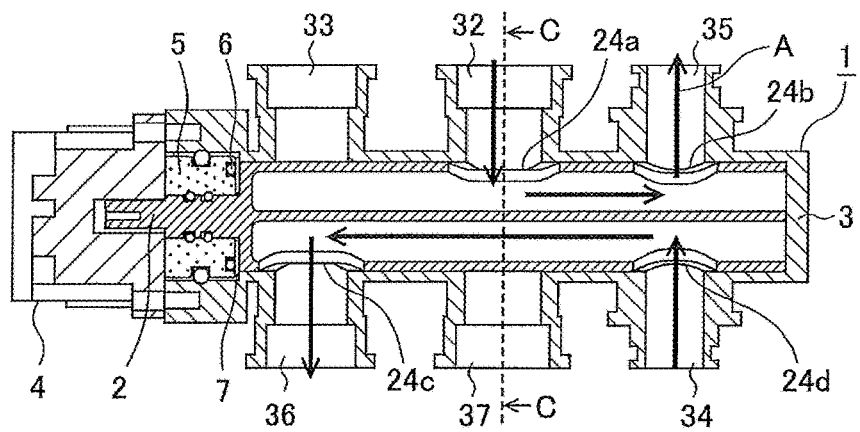
FIG. 5A to FIG. 5D are sectional views showing channels when a valve body is caused to rotate in increments of 90 degrees by a motor in the heating medium channel switching device according to the first embodiment of the invention.
Figure 5B:
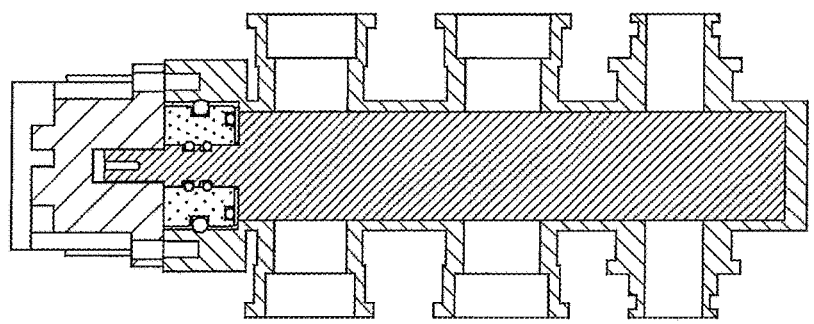
Figure 5C:
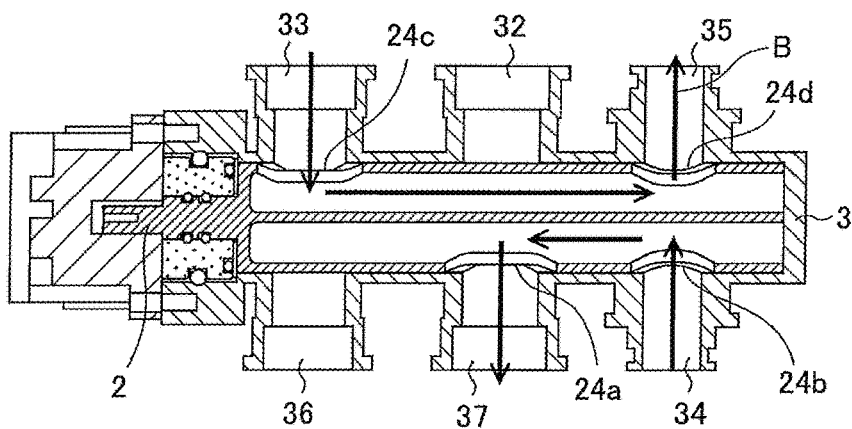
Figure 5D:
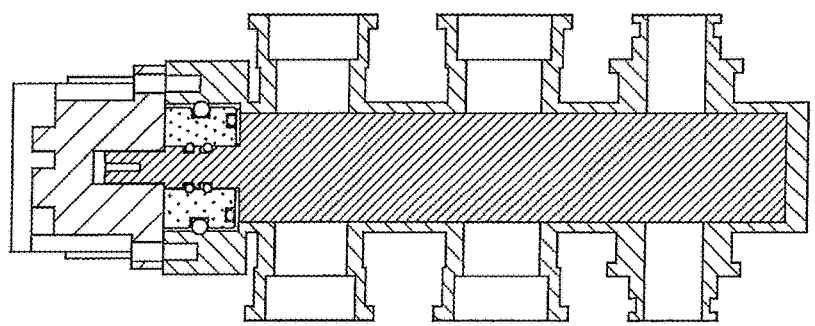

A channel switching operation by the heating medium channel switching device 1 will be described using FIG. 5A to FIG. 5D and FIG. 6A to FIG. 6D. FIG. 5A to FIG. 5D show a channel switching flow when the valve body 2 is caused to axially rotate by the motor 4, wherein FIG. 5B shows a state when an angle of rotation is 90 degrees, FIG. 5C shows a state when an angle of rotation is 180 degrees, and FIG. 5D shows a state when an angle of rotation is 270 degrees, when a state in FIG. 5A is taken to be an angle of rotation of 0 degree. Also, FIG. 6A to FIG. 6D are sectional views of a portion indicated by C-C in FIG. 5A, wherein FIG. 6A to FIG. 6D correspond to FIG. 5A to FIG. 5D respectively.

At a time of the angle of rotation of 0 degree shown in FIG. 5A, the first inlet 32 communicates with the aperture portion 24a while the common outlet 35 communicates with the aperture portion 24b, and the common inlet 34 communicates with the aperture portion 24d while the third outlet 36 communicates with the aperture portion 24c. Because of this, as shown by arrows A, a channel that conveys the warm water (first heating medium) made in the inter-heating medium heat exchanger 14 to the indoor unit 12, and a channel that returns the warm water (third heating medium) after an exchange of heat in the indoor unit 12 to the inter-heating medium heat exchanger 14, are in communication.

Meanwhile, at a time of the angle of rotation of 180 degrees shown in FIG. 5C, the second inlet 33 communicates with the aperture portion 24c while the common outlet 35 communicates with the aperture portion 24d, and the common inlet 34 communicates with the aperture portion 24b while the fourth outlet 37 communicates with the aperture portion 24a. Because of this, as shown by arrows B, a channel that conveys the cold water (second heating medium) made in the inter-heating medium heat exchanger 14 to the indoor unit 12, and a channel that returns the cold water (fourth heating medium) after an exchange of heat in the indoor unit 12 to the inter-heating medium heat exchanger 14, are in communication.

At a time of the angle of rotation of 90 degrees shown in FIG. 5B, and at a time of the angle of rotation of 270 degrees shown in FIG. 5D, none of the inlets or outlets of the body 3 communicate with the aperture portions 24. That is, there is a blocked state wherein no heating medium flows.

Also, FIG. 7 shows a state when the valve body 2 is rotated 30 degrees from the state of the angle of rotation of 0 degree of FIG. 6A. When the angle of rotation is 30 degrees, the channel that conveys the warm water made in the inter-heating medium heat exchanger 14 to the indoor unit 12, and the channel that returns the warm water after an exchange of heat in the indoor unit 12 to the inter-heating medium heat exchanger 14, are partially narrowed in comparison with when the angle of rotation is 0 degree. Because of this, pressure loss increases, and the flow decreases.

Although a state wherein the angle of rotation is 30 degrees is shown in FIG. 7, the angle of rotation can be set arbitrarily. That is, the heating medium flow can be controlled by controlling the angle of rotation of the valve body 2 with the motor 4. The angle of rotation of the valve body 2, that is, the heating medium flow is such that, for example, the temperature of the heating medium conveyed to the indoor unit 12 and the temperature of the heating medium returned to the inter-heating medium heat exchanger 14 from the indoor unit 12 are measured using a temperature sensor, and the difference between the temperatures is controlled so as to reach a target value. However, when flow regulation is unnecessary, a device such as an on/off power supply that can simply be switched may be used.

Figure 8:
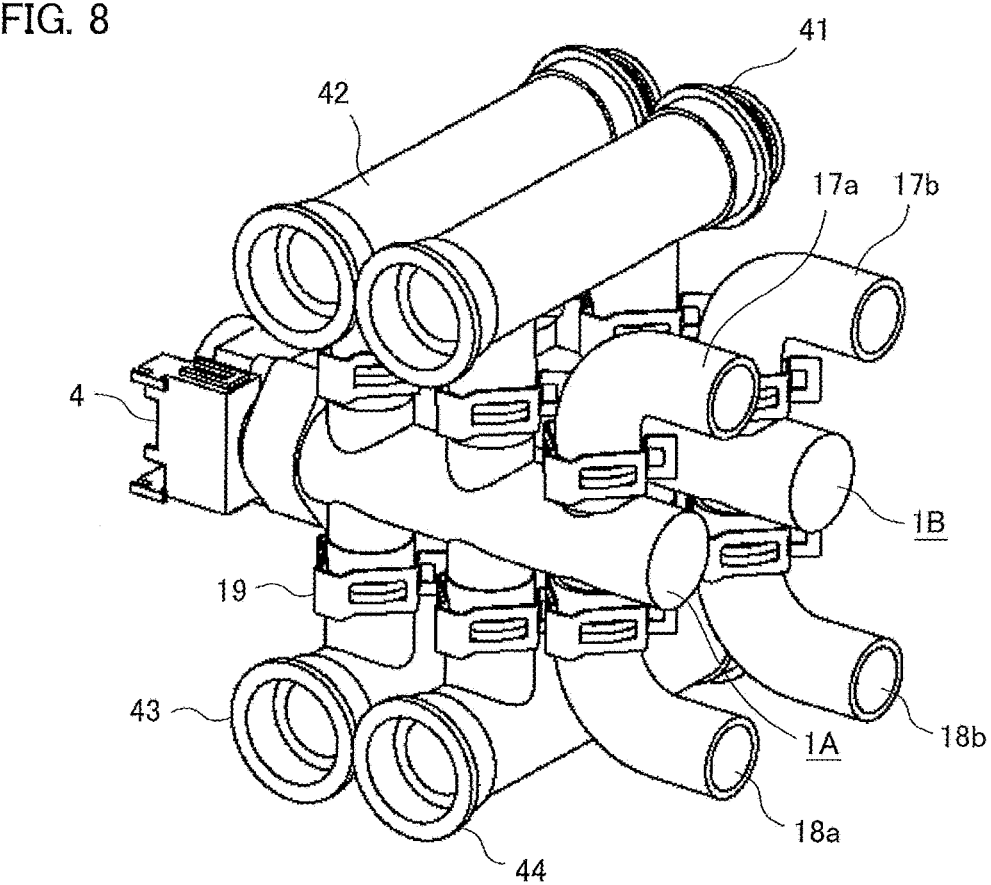
FIG. 8 is a perspective view showing a unit wherein two of the heating medium channel switching device according to the first embodiment of the invention are connected.

The necessary number of the heating medium channel switching device 1 according to the first embodiment is the same as the number of indoor units 12, and can be increased in accordance with the necessary quantity. Examples of installing a unit wherein a multiple of heating medium channel switching devices 1 are coupled will be described using FIG. 8 and FIG. 9. FIG. 8 shows a unit wherein two heating medium channel switching devices 1A and 1B are coupled, and FIG. 9 shows a unit wherein four heating medium channel switching devices 1A, 1B, 1C, and 1D are coupled.

Figure 9:
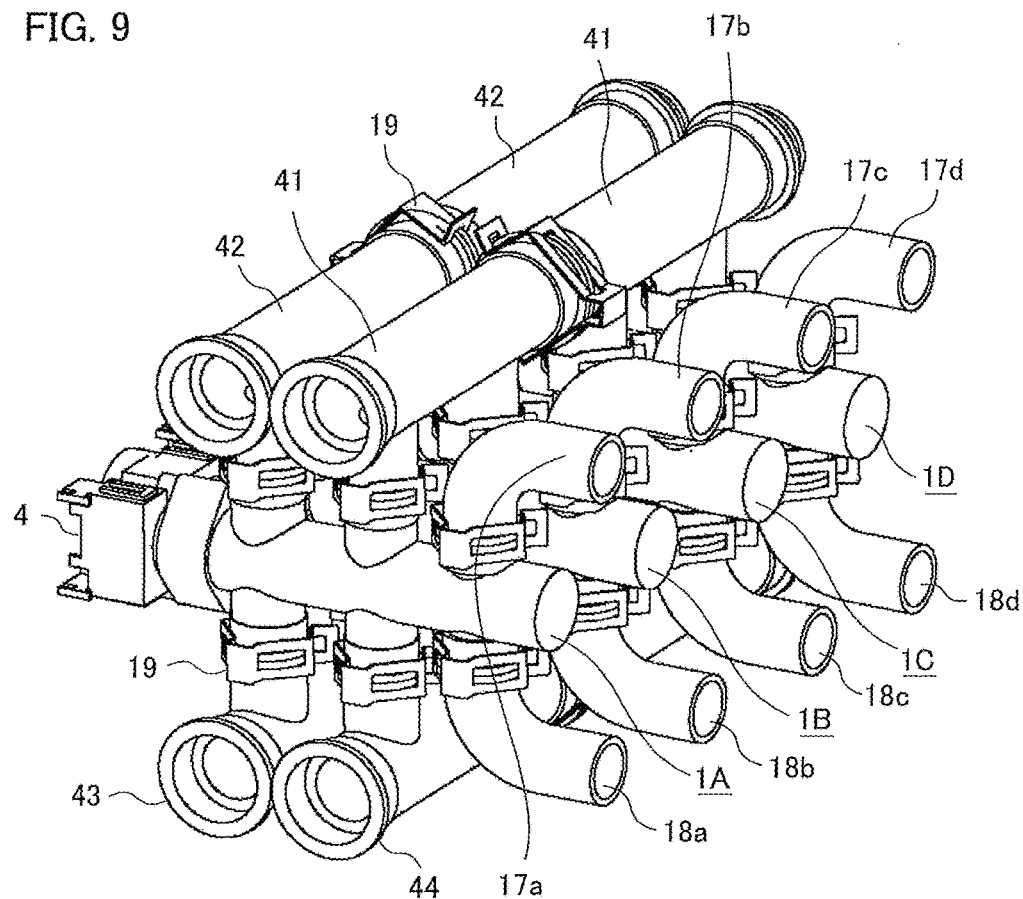
FIG. 9 is a perspective view showing a unit wherein four of the heating medium channel switching device according to the first embodiment of the invention are connected.

As shown in FIG. 8 and FIG. 9, each of heating medium channel switching devices 1A, 1B, and so on is connected to a warm water conveying coupling pipe 41, which is a pipe that conveys the warm water made in the inter-heating medium heat exchanger 14, a cold water conveying coupling pipe 42, which is a pipe that conveys the cold water made in the inter-heating medium heat exchanger 14, a warm water returning coupling pipe 43, which is a pipe that returns the warm water after circulating through the indoor unit 12 to the inter-heating medium heat exchanger 14, and a cold water returning coupling pipe 44, which is a pipe that returns the cold water after circulating through the indoor unit 12 to the inter-heating medium heat exchanger 14, and the heating medium channel switching devices 1A, 1B, and so on are coupled to each other.

That is, the multiple of bodies 3 are coupled to each other by the first inlets 32, second inlets 33, third outlets 36, and fourth outlets 37 of the multiple of bodies 3 being connected respectively to the warm water conveying coupling pipe 41, cold water conveying coupling pipe 42, warm water returning coupling pipe 43, and cold water returning coupling pipe 44.

Furthermore, the heating medium channel switching devices 1A, 1B, and so on are connected respectively to heating medium conveying pipes 17a, 17b, and so on, which convey the warm water or cold water to the indoor unit 12, and are connected to heating medium returning pipes 18a, 18b, and so on, which return the warm water or cold water after an exchange of heat in the indoor unit 12 to the inter-heating medium heat exchanger 14.

A quick fastener 19 formed by bending a metal plate is used in the coupling of the heating medium channel switching devices 1A, 1B, and so on and each pipe. The quick fastener 19 prevents heating medium leakage by an O-ring (omitted from the drawings) being incorporated.

A unit shown in FIG. 9 is such that two of the unit shown in FIG. 8 are disposed continuously, and is formed by the warm water conveying coupling pipes 41, cold water conveying coupling pipes 42, warm water returning coupling pipes 43, and cold water returning coupling pipes 44 connected to each unit being coupled. The quick fastener 19 and O-ring are also used in this kind of coupling of pairs of pipes. Note that by increasing the quantity of connection ports of the pipes and heating medium channel switching devices 1A, 1B, and so on, the quantity of pipes can be changed to an arbitrary quantity, whereby the number of parts is reduced.

Next, a method of manufacturing the heating medium channel switching device 1 according to the first embodiment will be described. The valve body 2, body 3, and holder 5 are manufactured in accordance with an injection molding method using, for example, a material that is a polyphenylene sulfide resin including 30% glass fiber (hereafter referred to as PPS). It is preferable that a dimensional difference between an inner peripheral surface of the valve chamber 31 of the body 3 and the side surface 23 of the valve body 2 is as small as possible, as the larger the difference, the greater the drop in performance.

In general, an anisotropic material including glass fiber is such that a contraction rate varies depending on the fiber orientation direction when molding, because of which molding with high accuracy is difficult. In particular, the valve body 2 is such that deformation is liable to occur because of the die structure, because of which it is desirable that a gate, which is a resin injection port, is provided at a leading end of a rotation shaft of the valve body 2, and that the resin flows as far as possible in the same direction. By so doing, transformation caused by the die structure is uniformized, and an improvement in accuracy is achieved by die correction or the like.

As the valve body 2 of the heating medium channel switching device 1 according to the first embodiment is such that the partition plate 21 is provided in a longitudinal direction in the interior, there is an advantage in that rigidity of the valve body 2 is high, and deformation is unlikely to occur. The valve body 2 and body 3 may be manufactured using another resin or another molding method, or may be manufactured in accordance with a forging method or casting method, using a metal material such as brass.

The packing 7 can be manufactured by a material with low frictional resistance, for example, polytetrafluoroethylene (PTFE) being formed in sheet form using an extrusion molding method, and punched out with a press die. Compression molding or the like, or another manufacturing method such as cutting, may also be used. For example, the packing 7 may be manufactured with an injection molding method using a material with a low friction coefficient, such as a tetrafluoroethylene-perfluoroalkyl vinyl ether copolymer (PFA). The O-ring 6 can be manufactured in accordance with a press molding using, for example, ethylene propylene rubber (EPDM).

The pipes such as the warm water conveying coupling pipe 41 and cold water conveying coupling pipe 42 are manufactured with an injection molding method using, for example, a polyphenylene sulfide (PPS) resin. However, a resin other than PPS, or another molding method, may also be used. Also, a metal pipe of copper, stainless steel, or the like may also be used.

Metal pipes of, for example, copper, stainless steel, or the like are used as the heating medium conveying pipes 17 and heating medium returning pipes 18 connecting the heating medium channel switching device 1 and each indoor unit 12. Alternatively, the heating medium conveying pipes 17 and heating medium returning pipes 18 may be manufactured with an injection molding method or blow molding method using a resin material such as PPS.

Next, a method of assembling the parts of the heating medium channel switching device 1 will be described. Firstly, the valve body 2 is inserted into the body 3. Continuing, the packing 7 is attached to a leading end portion of the valve body 2 to be connected to the motor 4, and furthermore, the holder 5, on which the O-ring 6 is mounted in advance, is attached. Continuing, the motor 4 is fixed to the body 3 using a metal plate, screw, or the like.

Next, the inlets and outlets of two heating medium channel switching devices 1 assembled using this procedure are coupled to the warm water conveying coupling pipe 41, cold water conveying coupling pipe 42, warm water returning coupling pipe 43, and cold water returning coupling pipe 44 with the quick fastener 19, thereby forming a unit, as shown in FIG. 8. Furthermore, a multiple of units are fabricated so that the quantity of heating medium channel switching devices 1 is a required quantity, and combined by coupling the pipes such as the warm water conveying coupling pipe 41, as shown in FIG. 9.

Continuing, the heating medium channel switching device 1 unit is embedded in the relay unit 13, and the heating medium conveying pipes 17 and heating medium returning pipes 18 are attached to each heating medium channel switching device 1, whereby assembly is completed. When providing the necessary number of ports for connection with the heating medium channel switching device 1 in the pipes such as the warm water conveying coupling pipe 41, the work of coupling pairs of pipes is unnecessary. That is, the greater the number of connection ports provided in the pipes, the less the number of coupling parts needed, and the easier the assembly work becomes.

According to the heating medium channel switching device 1 according to the first embodiment, as heretofore described, the valve body 2 whose interior is partitioned into the two channels 22 by the partition plate 21 is included, because of which one of the first heating medium and second heating medium can be selected and conveyed by one channel 22, and one of the third heating medium and fourth heating medium can be selected and conveyed by the other channel 22. Also, the heating medium flow can be controlled by the angle of rotation of the valve body 2 being controlled.

Also, the air conditioning device 10 including the heating medium channel switching device 1 according to the first embodiment is such that two kinds of heating medium, for warming and for cooling, can be switched and conveyed in two channels, those being a channel that conveys a heating medium from the relay unit 13 to each indoor unit 12 and a channel that returns a heating medium from each indoor unit 12 to the relay unit 13, and the heating medium flow can be regulated.

Consequently, according to the first embodiment, various parts, such as heating medium control parts, pipes, and coupling parts, can be omitted compared with an existing air conditioning device wherein two heating medium channel switching devices and a heating medium flow regulating device, and three motors that drive these, are needed for one indoor unit, whereby a reduction in device size, a reduction in manufacturing costs, and a saving of energy are achieved.

Furthermore, maintenance management of a specific indoor unit 12 and pipe parts can be carried out with the heating medium channel switching device 1 corresponding to the specific indoor unit 12 in a blocked state and other indoor units 12 in an operated state, because of which maintainability is also superior.

Second Embodiment

Figure 10:
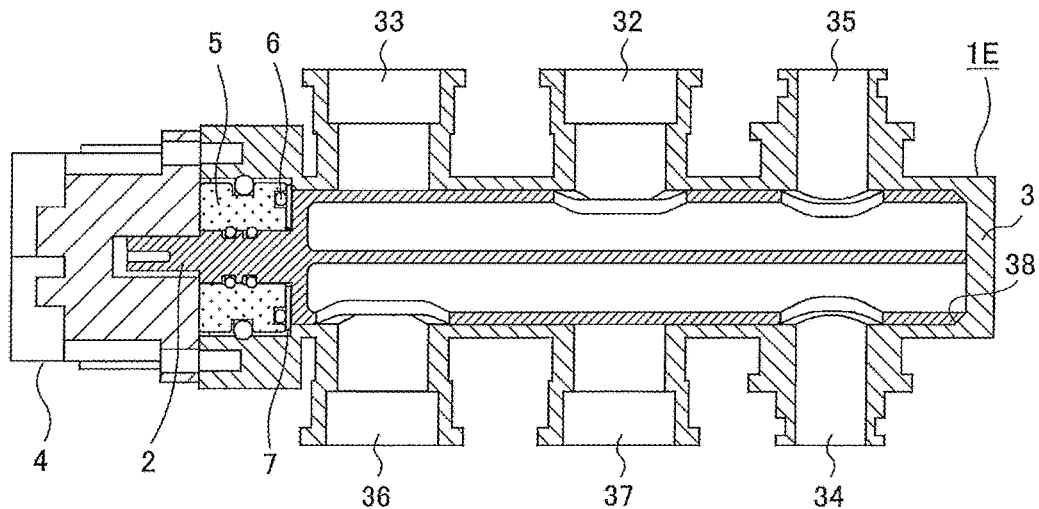
FIG. 10 is a sectional view showing a heating medium channel switching device according to a second embodiment of the invention.

FIG. 10 is a sectional view showing a heating medium channel switching device according to a second embodiment of the invention. As an overall configuration and operation of a heating medium channel switching device 1E according to the second embodiment are the same as in the first embodiment, a description thereof will be omitted.

As shown in FIG. 10, the heating medium channel switching device 1E according to the second embodiment has a tapered portion 38 in a bottom surface peripheral edge portion of a valve chamber of the body 3. Also, the valve body 2 has a leading end portion of a form that coincides with the tapered portion 38 of the body 3.

By this kind of tapered portion 38 being provided, deviation of the valve body 2 when the valve body 2 is driven by the motor 4 is restricted, whereby an increase in the necessary drive torque caused by contact with the body 3 can be restricted. Also, the necessary drive torque can be further reduced by, for example, a material with a low friction coefficient, whose resistance to friction is increased by PTFE being included in PPS, being used as the material of the body 3 and valve body 2.

According to the heating medium channel switching device 1E according to the second embodiment, in addition to the same advantages as in the first embodiment, the necessary drive torque can be reduced, whereby a saving of energy is achieved.

Third Embodiment

Figure 11:
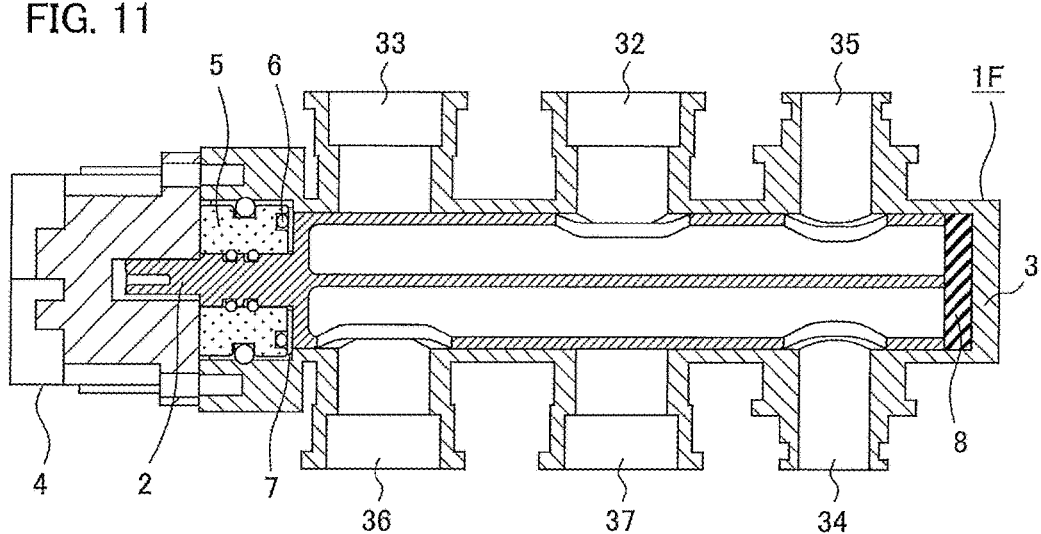
FIG. 11 is a sectional view showing a heating medium channel switching device according to a third embodiment of the invention.

FIG. 11 is a sectional view showing a heating medium channel switching device according to a third embodiment of the invention. As an overall configuration and operation of a heating medium channel switching device 1F according to the third embodiment are the same as in the first embodiment, a description thereof will be omitted.

As shown in FIG. 11, the heating medium channel switching device 1F according to the third embodiment includes packing 8 between a bottom surface of a valve chamber of the body 3 and a leading end portion of the valve body 2 opposing the bottom surface. By the packing 8 being inserted between the body 3 and valve body 2, heating medium leakage between the body 3 and valve body 2 can be restricted, whereby performance improves.

Also, an advantage in that the drive torque of the valve body 2 is restricted, and an advantage in that life span is lengthened by abrasion of the valve body 2 and body 3 being restricted, are achieved by a material with a low friction coefficient, such as PTFE or PFA, being used as the material of the packing 8. The packing 8 can be manufactured by PTFE being formed in a sheet form using an extrusion molding method, and this being punched out with a press die. Alternatively, the packing 8 may be manufactured using compression molding or the like, or another method such as cutting.

According to the heating medium channel switching device 1F according to the third embodiment, in addition to the same advantages as in the first embodiment, an advantage in that heating medium leakage between the body 3 and valve body 2 is restricted, an advantage in that the drive torque of the valve body 2 is restricted, and an advantage in that the life spans of the valve body 2 and body 3 are lengthened, are obtained.

Fourth Embodiment

Figure 12:
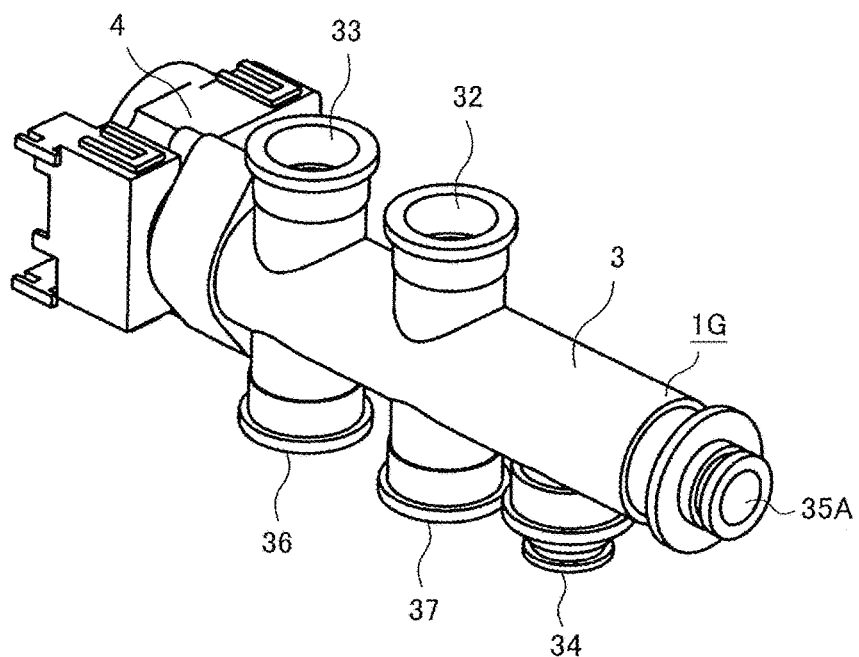
FIG. 12 is a perspective view showing a heating medium channel switching device according to a fourth embodiment of the invention.
Figure 13:
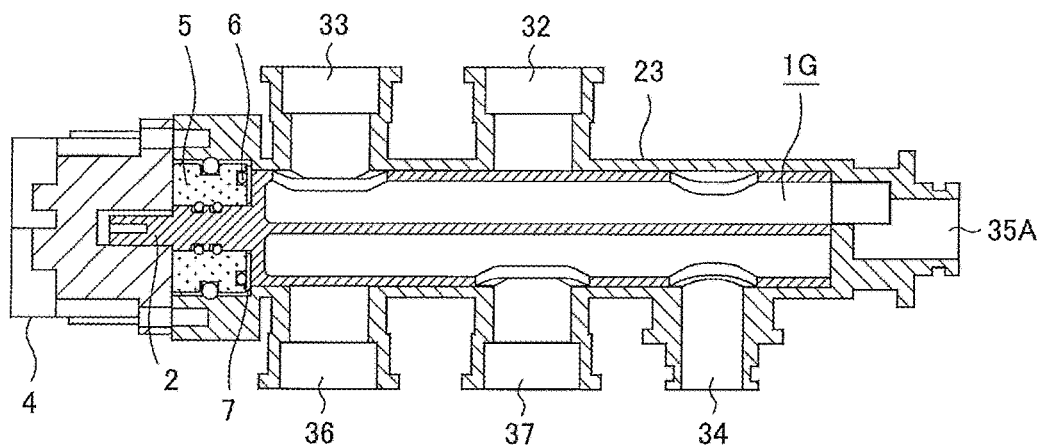
FIG. 13 is a sectional view showing the heating medium channel switching device according to the fourth embodiment of the invention.

FIG. 12 and FIG. 13 are a perspective view and a sectional view showing a heating medium channel switching device according to a fourth embodiment of the invention. As an overall configuration and operation of a heating medium channel switching device 1G according to the fourth embodiment are the same as in the first embodiment, a description thereof will be omitted.

The heating medium channel switching device 1G according to the fourth embodiment is such that the valve body 2 communicates with a valve chamber in a bottom surface portion thereof, and the body 3 has a common outlet 35A in a bottom surface of a valve chamber. Because of this, a straight structure can be adopted rather than a structure wherein the heating medium conveying pipes 17 are bent at 90 degrees (refer to FIG. 8).

Figure 14:
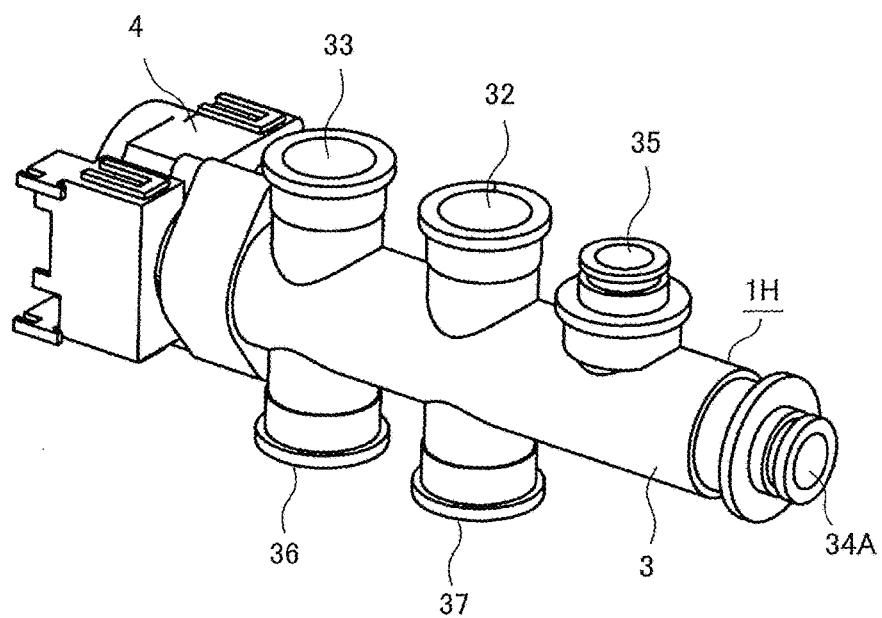
FIG. 14 is a perspective view showing another heating medium channel switching device according to the fourth embodiment of the invention.

Also, FIG. 14 is a perspective view showing another heating medium channel switching device according to the fourth embodiment. A heating medium channel switching device 1H is such that the valve body 2 communicates with a valve chamber in a bottom surface portion thereof, and the body 3 has a common inlet 34A in a bottom surface of a valve chamber. Because of this, a straight structure can be adopted rather than a structure wherein the heating medium returning pipes 18 are bent at 90 degrees (refer to FIG. 8).

According to the air conditioning device 10 including the heating medium channel switching devices 1G and 1H according to the fourth embodiment, in addition to the same advantages as in the first embodiment, pipes of a straight structure can be used for the heating medium conveying pipes 17 or heating medium returning pipes 18 in accordance with the part layout of the relay unit 13, whereby a reduction in size of the relay unit 13 is achieved. Alternatively, by adopting a straight structure, another part can be provided in an empty space in the relay unit 13.

Fifth Embodiment

Figure 15:
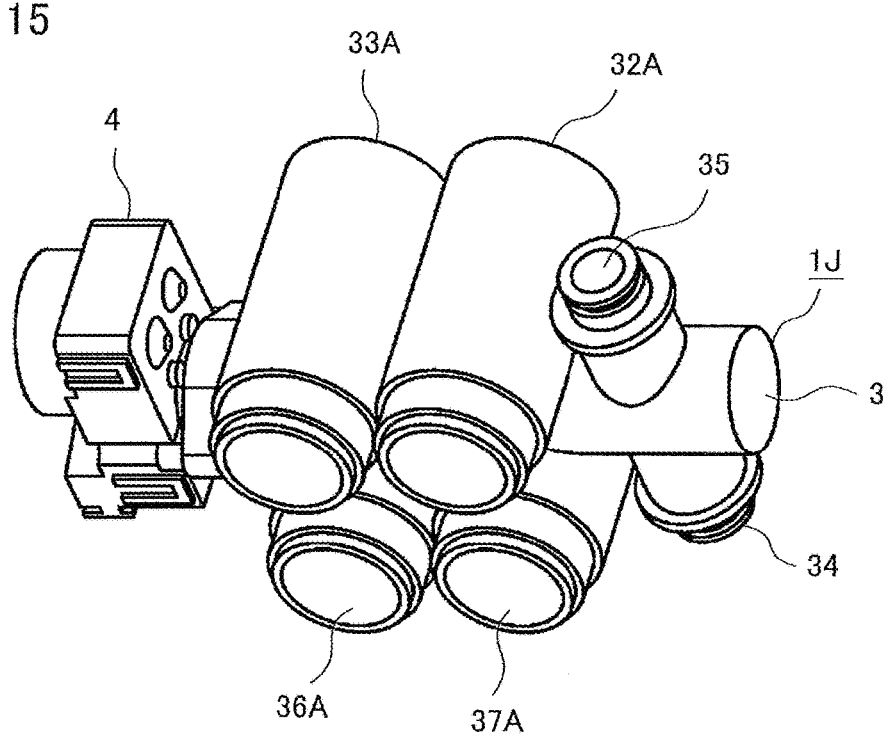
FIG. 15 is a perspective view showing a heating medium channel switching device according to a fifth embodiment of the invention.
Figure 16:
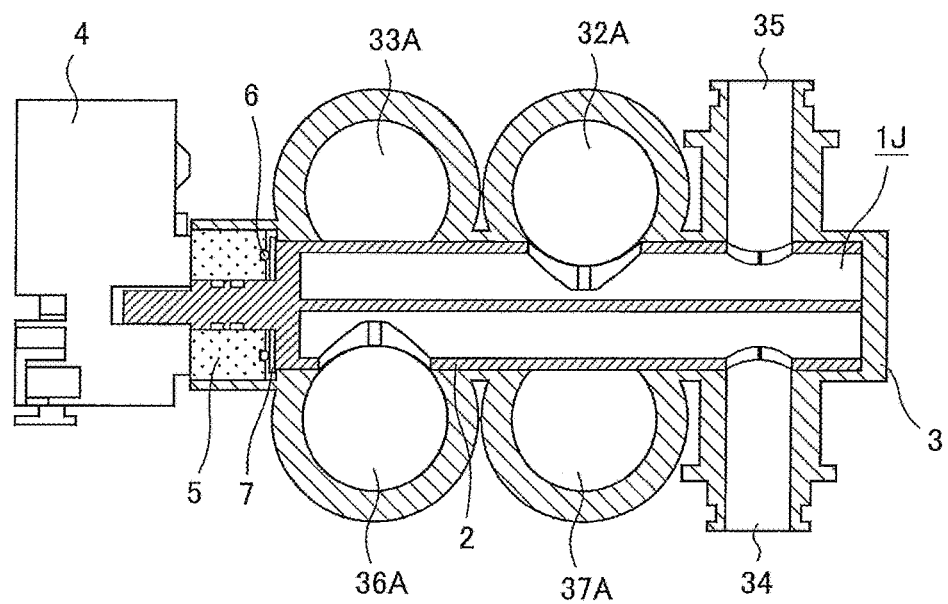
FIG. 16 is a sectional view showing the heating medium channel switching device according to the fifth embodiment of the invention.

FIG. 15 and FIG. 16 are a perspective view and a sectional view showing a heating medium channel switching device according to a fifth embodiment of the invention. As a multiple of a heating medium channel switching device 1J according to the fifth embodiment are used, a structure is such that neighboring first inlets 32A, second inlets 33A, third outlets 36A, and fourth outlets 37A can be coupled. As configurations other than this, and an operation, are the same as in the first embodiment, a description thereof will be omitted.

The body 3 of the heating medium channel switching device 1J according to the fifth embodiment has the first inlet 32A, second inlet 33A, third outlet 36A, and fourth outlet 37A of cylindrical forms wherein both ends are opened. A multiple of bodies 3 can be coupled by the first inlets 32A, second inlets 33A, third outlets 36A, and fourth outlets 37A of the multiple of bodies 3 being connected to each other.

Figure 17:
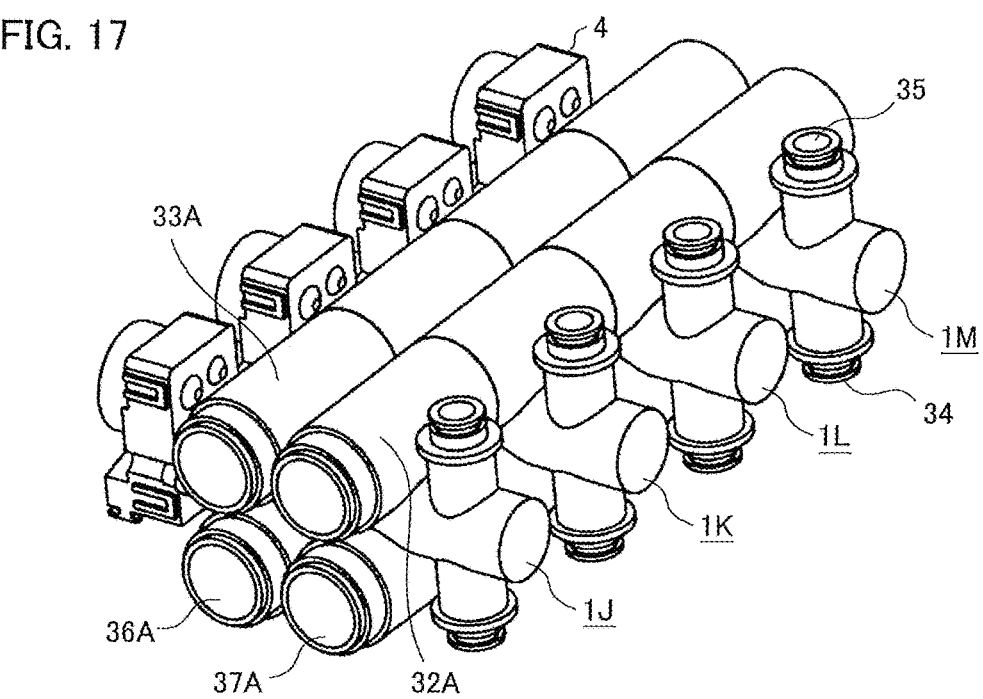
FIG. 17 is a perspective view showing a unit wherein four of the heating medium channel switching device according to the fifth embodiment of the invention are connected.

FIG. 17 shows a unit wherein four heating medium channel switching devices 1J, 1K, 1L, and 1M are coupled. As shown in FIG. 17, the first inlets 32A, second inlets 33A, third outlets 36A, and fourth outlets 37A of the four heating medium channel switching devices 1J, 1K, 1L, and 1M are disposed connected to form a pipe. Because of this, the kinds of warm water conveying coupling pipe 41, cold water conveying coupling pipe 42, warm water returning coupling pipe 43, and cold water returning coupling pipe 44 of the first embodiment (refer to FIG. 8) are unnecessary.

A composite valve including a first valve chamber that houses a valve body of a mixing/switching valve, a second valve chamber that houses a valve body of a flow control valve, two driving motors, one for each valve body, and a channel that causes the first valve chamber and second valve chamber to communicate, has been disclosed as a comparison example of the heating medium channel switching device 1J according to the fifth embodiment (Patent Document 2). In the comparison example too, a multiple of the composite valve are coupled by inlets and outlets of the multiple of the composite valve being caused to communicate directly.

The heating medium channel switching device 1J according to the fifth embodiment is such that, in addition to having a simpler structure than that of the comparison example, the valve body 2 has the partition plate 21 in a longitudinal direction in the interior thereof, because of which the rigidity of the valve body 2 is high, and deformation is unlikely to occur when molding. Because of this, the heating medium channel switching device 1J is such that no secondary processing step such as a mechanical processing is needed after molding, and as one motor 4 is sufficient, costs are low compared with the comparison example.

According to the air conditioning device 10 including the heating medium channel switching device 1J according to the fifth embodiment, in addition to the same advantages as in the first embodiment, pipes such as the warm water conveying coupling pipe 41 can be omitted, because of which a reduction in costs owing to a reduction in the number of parts, a reduction in manufacturing costs, and a reduction in size of the relay unit 13, are achieved. The embodiments can be freely combined, and each embodiment can be modified or omitted as appropriate, without departing from the scope of the invention.

The invention claimed is:

1. A heating medium channel switching device, comprising:
    a cylindrical valve body wherein an interior is partitioned into two channels by a partition plate disposed in a longitudinal direction and two aperture portions that form a heating medium outlet and inlet are provided in a side surface corresponding to each of the channels; and
    a body having a valve chamber that houses the valve body, a plurality of inlets that communicate with the aperture portions and allow a heating medium to flow into the valve body, and a plurality of outlets that communicate with the aperture portions and allow a heating medium to flow out from the valve body, wherein
    the body has as the inlets, a first inlet into which a first heating medium flows, a second inlet into which a second heating medium flows, and a common inlet into which either one of a third heating medium or fourth heating medium flows, and has as the outlets, a common outlet out of which either one of the first heating medium or the second heating medium flows, a third outlet out of which the third heating medium flows, and a fourth outlet out of which the fourth heating medium flows, and
    the valve body being configured such that one of the aperture portions of one of the channels communicates with either one of the first inlet or the second inlet while the other aperture portion of the channel communicates only with the common outlet, and one of the aperture portions of the other channel communicates only with the common inlet while the other aperture portion of the channel communicates with either one of the third outlet or the fourth outlet.

2. The heating medium channel switching device according to claim 1, comprising:
    a motor that causes the valve body to axially rotate inside the valve chamber, thereby controlling a relative position of the valve body inside the valve chamber, wherein
    when an angle of rotation of the valve body is 0 degree when one of the aperture portions of one of the channels of the valve body communicates with the first inlet while the other aperture portion of the channel communicates with the common outlet, and one of the aperture portions of the other channel communicates with the common inlet while the other aperture portion of the channel communicates with the third outlet in the valve chamber,
    one of the aperture portions of one of the channels of the valve body communicates with the second inlet while the other aperture portion of the channel communicates with the common outlet, and one of the aperture portions of the other channel communicates with the common inlet while the other aperture portion of the channel communicates with the fourth outlet when the angle of rotation of the valve body is 180 degrees, and
    none of the inlets or outlets communicates with the aperture portions when the angle of rotation of the valve body is 90 degrees or 270 degrees.

3. The heating medium channel switching device according to claim 2, wherein
    the motor controls a heating medium flow by controlling the angle of rotation of the valve body.

4. The heating medium channel switching device according to claim 1, wherein
    the body has a tapered portion in a peripheral edge portion of a bottom surface of the valve chamber, and the valve body has a leading end portion of a form that coincides with the tapered portion.

5. The heating medium channel switching device according to claim 1, comprising
    packing between a bottom surface of the valve chamber of the body and a leading end portion of the valve body opposing the bottom surface.

6. The heating medium channel switching device according to claim 5, wherein
    polytetrafluoroethylene or a tetrafluoroethylene-perfluoroalkyl vinyl ether copolymer is used as a material of the packing.

7. The heating medium channel switching device according to claim 1, wherein
    the valve body communicates with the valve chamber in a bottom surface portion of the valve body, and the body has the common inlet or the common outlet in the bottom surface of the valve body.

8. The heating medium channel switching device according to claim 1, wherein
    the first inlet, the second inlet, the third outlet, and the fourth outlet being connected, respectively, to a conveying pipe of the first heating medium, a conveying pipe of the second heating medium, a returning pipe of the third heating medium, and a returning pipe of the fourth heating medium.

9. The heating medium channel switching device according to claim 1, wherein
    the body has the first inlet, the second inlet, the third outlet, and the fourth outlet, of cylindrical forms wherein both ends are opened, and a plurality of the bodies are coupled by the first inlets, the second inlets, the third outlets, and the fourth outlets of the plurality of the bodies being connected to each other.

10. An air conditioning device, comprising:
    a heat source machine disposed outdoors;
    a plurality of indoor units installed in a space subjected to air conditioning; and a relay unit disposed between the heat source machine and indoor units, and having a refrigerant circulation circuit that causes a heat source side refrigerant to circulate and a heating medium circulation circuit that causes a heating medium to circulate, wherein the relay unit includes an inter-heating medium heat exchanger, which carries out an exchange of heat between a heat source side refrigerant and a heating medium, and the heating medium channel switching device according to claim 1.

11. A heating medium channel switching device, comprising:

a cylindrical valve body wherein an interior is partitioned into two channels by a partition plate disposed in a longitudinal direction and two aperture portions that form a heating medium outlet and inlet are provided in a side surface corresponding to each of the channels; and a body having a valve chamber that houses the valve body, a plurality of inlets that communicate with the aperture portions and allow a heating medium to flow into the valve body, and a plurality of outlets that communicate with the aperture portions and allow a heating medium to flow out from the valve body, wherein the body has as the inlets, a first inlet into which a first heating medium flows, a second inlet into which a second heating medium flows, and a common inlet into which either one of a third heating medium or fourth heating medium flows, and has as the outlets, a common outlet out of which either one of the first heating medium or the second heating medium flows, a third outlet out of which the third heating medium flows, and a fourth outlet out of which the fourth heating medium flows, and the valve body being configured such that one of the aperture portions of one of the channels communicates with either one of the first inlet or the second inlet while the other aperture portion of the channel communicates with the common outlet, and one of the aperture portions of the other channel communicates with the common inlet while the other aperture portion of the channel communicates with either one of the third outlet or the fourth outlet, each of the two channels is fluidically isolated from the other of the two channels.

* * * * *